United States Patent [19]

Barron et al.

[11] 4,425,614
[45] Jan. 10, 1984

[54] SELF-ORGANIZING CONTROL SYSTEM

[75] Inventors: Roger L. Barron; Dixon Cleveland, both of Annandale, Va.

[73] Assignee: Adaptronics, Inc., McLean, Va.

[21] Appl. No.: 381,244

[22] Filed: Jul. 20, 1973

Related U.S. Application Data

[63] Continuation-in-part of Ser. No. 883,549, Dec. 9, 1969, abandoned.

[51] Int. Cl.³ .................... G05B 13/02; G06F 15/50; G06G 7/78
[52] U.S. Cl. .................................. 364/158; 244/195; 364/162; 364/172; 364/431.02
[58] Field of Search ............... 60/39.28 R, 243; 244/191, 182, 195; 235/150.2; 364/158, 162, 172, 431.02

[56] References Cited

U.S. PATENT DOCUMENTS

| | | | |
|---|---|---|---|
| 3,019,604 | 2/1962 | Hall | 60/239 X |
| 3,310,666 | 3/1967 | Millar et al. | 235/151.3 X |
| 3,316,713 | 5/1967 | Urban | 60/39.28 R |
| 3,377,848 | 4/1968 | Marvin | 60/39.28 R X |
| 3,472,027 | 10/1969 | Snow et al. | 60/39.28 R X |
| 3,519,998 | 7/1970 | Barron | 340/172.5 |
| 3,533,236 | 10/1970 | Cottington | 60/39.28 R |
| 3,758,764 | 9/1973 | Harner | 235/150.2 |
| 3,764,785 | 10/1973 | Harner et al. | 235/150.21 |

OTHER PUBLICATIONS

"Self-Organizing Control of Advanced Turbine Engines" by Barron et al., Technical Report AFAPL--TR-69-73, Tech. Abstract Bulletin #69-20, AD8-57-616, dated Aug. 1969, pp. 65-70, 108 and 111.

*Primary Examiner*—Jerry Smith
*Attorney, Agent, or Firm*—Jay M. Cantor

[57] ABSTRACT

The disclosure relates to a self-organizing control of advanced turbine engines wherein thrust is controlled and thrust specific fuel consumption (TSFC) is minimized by control of the fuel flow rate as well as optimization of system geometric parameters. The controller computes the net thrust error by comparing commanded thrust with an inferred or calculated thrust measurement.

36 Claims, 9 Drawing Figures

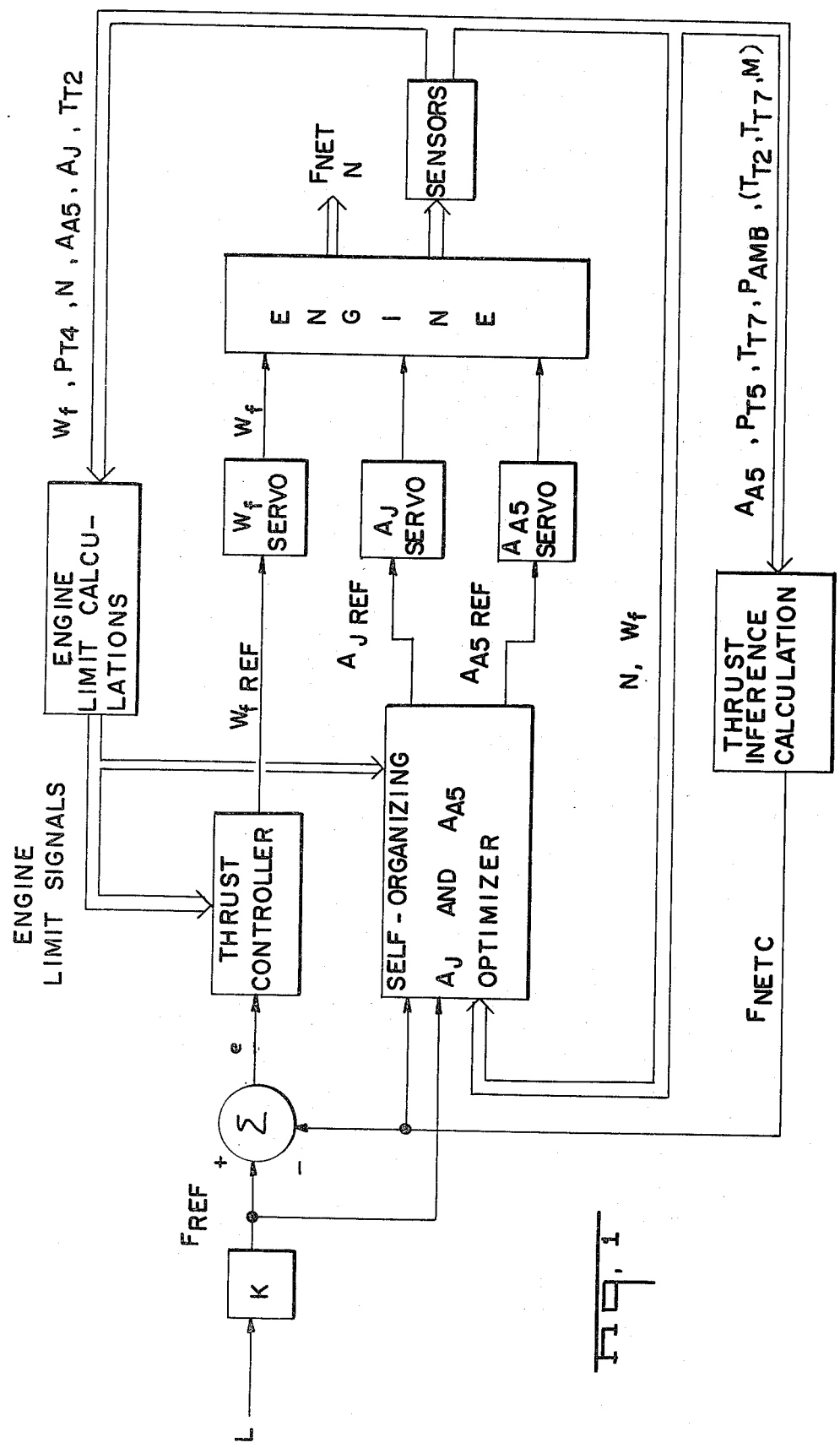

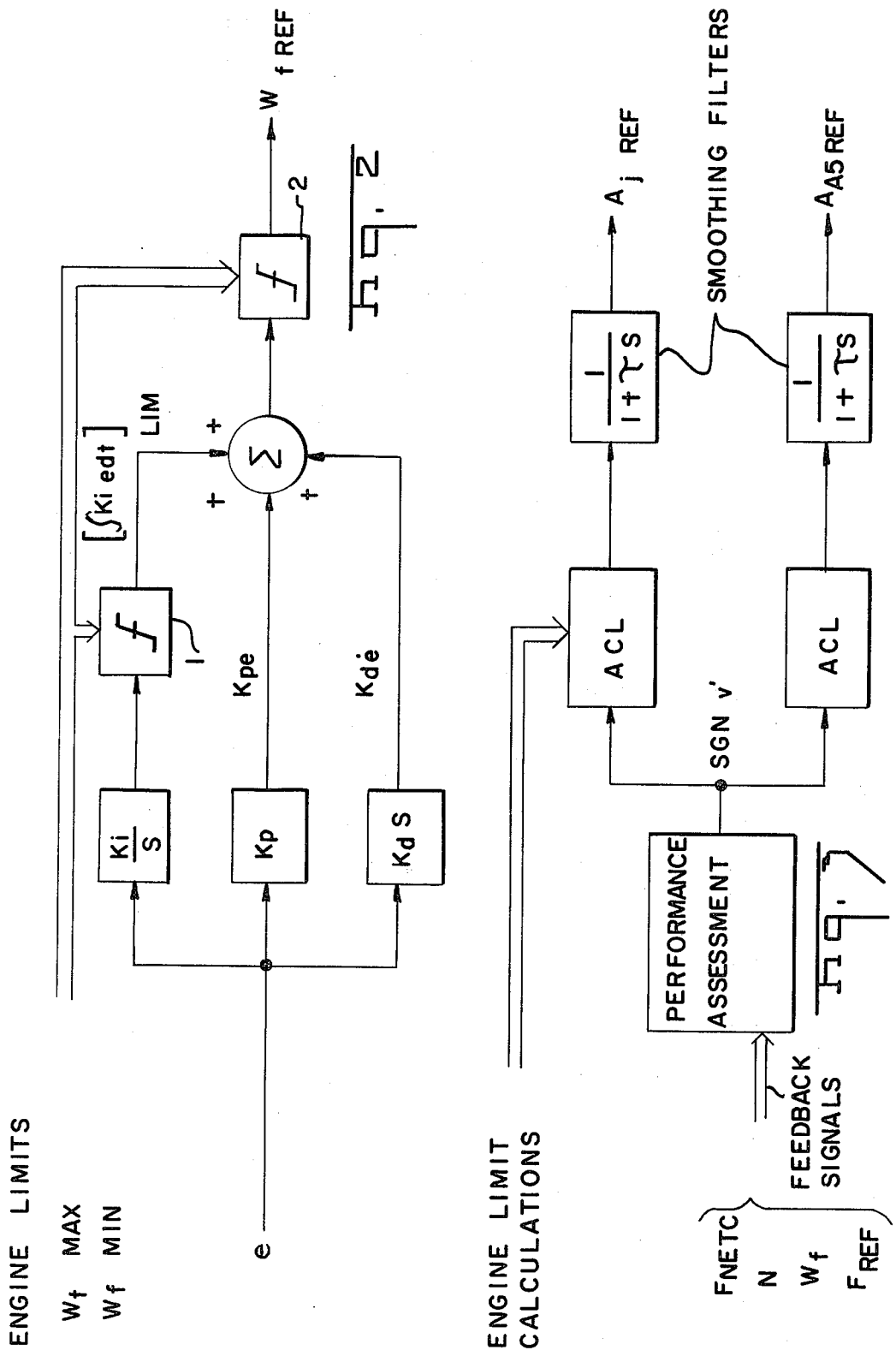

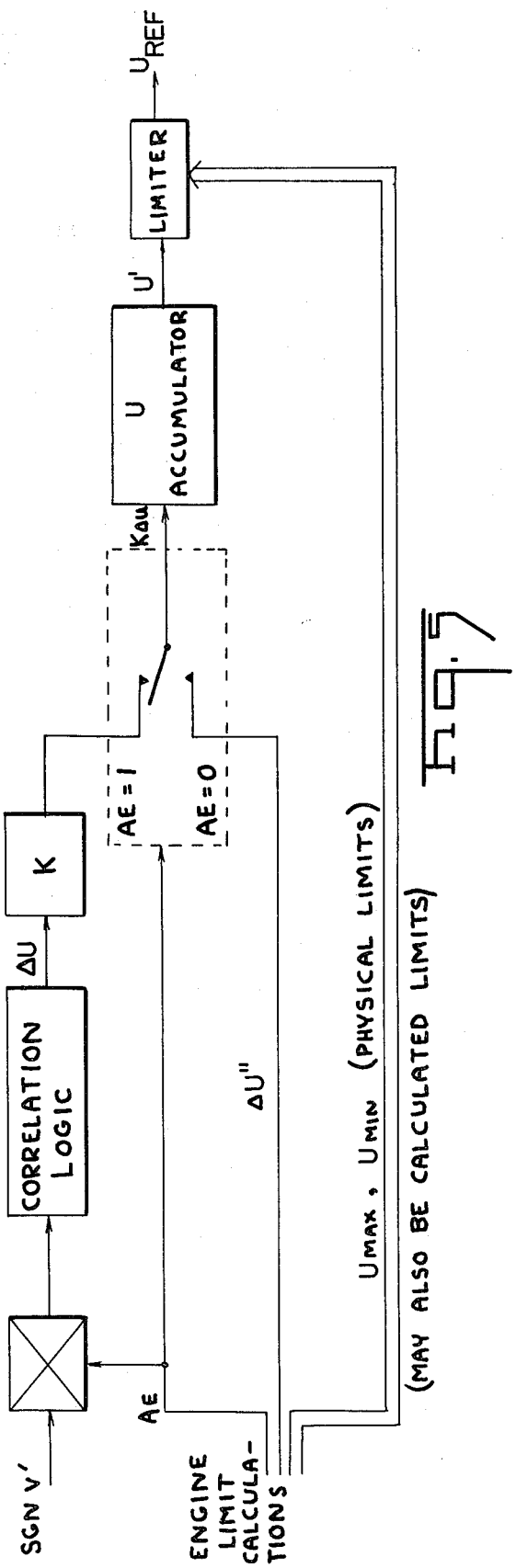

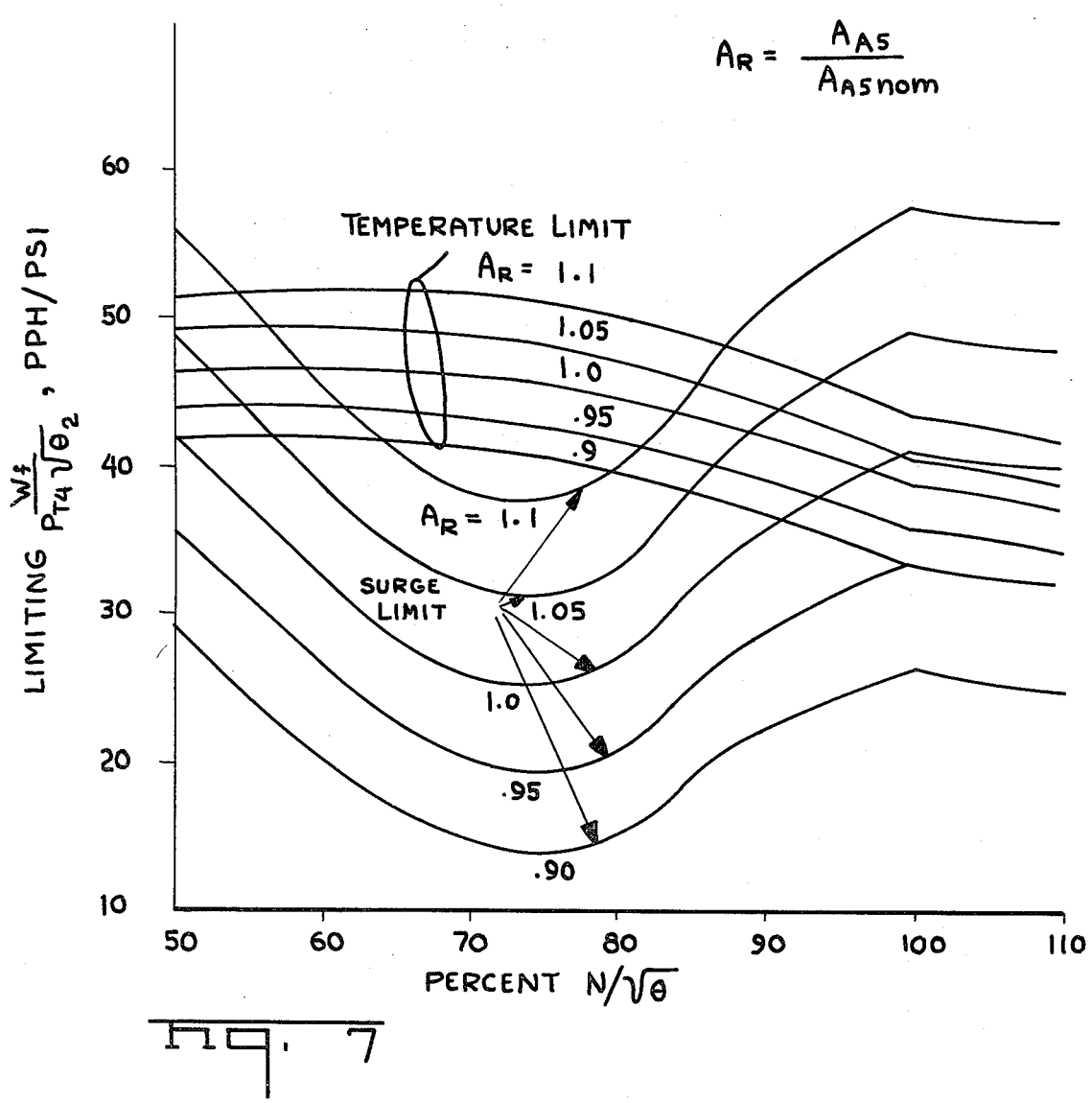

SELF-ORGANIZING CONTROL SYSTEM

This is a continuation-in-part of our prior copending application, Ser. No. 883,549, filed Dec. 9, 1969 and now abandoned.

This invention relates to a self-organizing control system for controlling a turbo jet engine and, more specifically, to a self-organizing control system for optimizing fuel consumption at all thrust conditions by producing maximum cycle and propulsive efficiency for a prescribed flight path.

When the parameters and characteristics of a controlled plant, such as an advanced turbine engine, are variable and depend on the magnitude of disturbances or on other operating conditions in ways which are unknown or difficult to predict, the control system must have very low sensitivity to changes in operating conditions. A control system can be called "adaptive" if it achieves essentially invariant control response throughout the operational envelope of the controlled vehicle. In common usage, however, the term "adaptive" is reserved for those systems which adjust themselves on-line to improve their behavior in terms of computed control performance indices.

To achieve partial invariance of performance, conventional control systems often schedule the controller parameters as functions of reference inputs and sensor data (power lever angle, Mach number, ambient pressure, engine RPM, etc.). Early work in adaptive control systems sought to eliminate this scheduling and thereby reduce the reliance on extensive design tailoring and performance losses resulting from non-standard conditions. This basic work was initiated fifteen years ago, and efforts to synthesize the adaptive controls usually followed one of three avenues: (i) sensing a property of the plant response (e.g., limit-cycle amplitude) and adjusting controller gain to hold this property constant, (ii) comparing plant responses with those of a reference model and varying parameters of the controller so as to achieve reasonable agreement, or (iii) using special test signals and on-line data reductions to identify and compensate plant dynamics.

While those first adaptive controls placed less dependence on a priori models and scheduling, they were slow to adapt, complex, and unable to use general performance indices. Also, the early techniques did not solve the difficulties of coupled plant response variables and/or actuators which interact by affecting more than one response variable. These problems appear most frequently with high-performance systems: modern aeropropulsion systems, aircraft, and missiles exhibit much more severe dynamic cross-coupling and actuator interaction than their predecessors. In addition, enlargements of the operating envelopes (with, for example, velocities of some VTOL aircraft ranging from zero during hover to mid-supersonic during combat), taken with variable-geometry plant configurations, have made the requirements on control system adaptation even more acute.

In the broadest sense, design of an "adaptive" control system may employ controller elements having one or more of the following characteristics:

1. Fixed structure, selected to achieve at least partial invariance of performance with changes in operating condition 2. Variable structure, using deterministic laws for switching controller parameter values as functions of the state of the controlled vehicle 3. Self-adjusting or self-organizing structure (using adaptation in the usual sense) with controller states of other functional properties changing rapidly under supervision of devices which assess current system performance 4. Learned structure, related to that of self-adjusting or self-organizing systems, but which adapts more slowly, using recall from long-term memory and relating current situations (or patterns) to the controller experience in similar prior situations.

In accordance with the present invention, a self-organizing control system is utilized to control an advanced turbo jet engine, with the self-organizing controller differing from the prior art adaptive controllers in that it adjusts its characteristics during both transient and steady-state operation of the system. For on-line optimization of turbine-inlet area and exhaust-nozzle area of a turbo jet engine, where thrust specific fuel consumption (TSFC) is to be minimized, most of the adaptation takes place during quasi steady-state conditions. Nevertheless, it is important that thrust transients due to area changes, or from any other cause, not impede the optimization process. Basically, the self-organizing controller provides a search for system parameter values which optimize performance. The fundamental design of the controller incorporates the probability state variable search algorithm, which is suitable for simultaneous adjustments in multiple parameters. Alternatively, a search algorithm which uses alternating adjustments of the parameters with one parameter undergoing adjustment at a time can also be used. The self-organizing controller controls fuel-flow rate as well as optimization of system geometric parameters such as turbine-inlet and exhaust-nozzle areas. The controller for fuel flow rate computes the net thrust error and varies fuel flow in proportion to a linear function of this error, its time integral and its first derivative. The output of this controller becomes the reference signal for the fuel-flow actuator. An alternative system would be to use the thrust controller output as the reference for a speed control loop that is internal to the thrust control loop.

The self-organizing control system of the present invention includes a performance assessment unit which, in part, distinguishes the self-organizing controller from other adaptive controllers. This unit employs differentiation or difference techniques and logic for computing a binary performance value signal, V, which indicates if trends are favorable or adverse.

In the preferred embodiment of the self-organizing control system of the present invention, which is set forth in a turbine engine application, the performance assessment unit computes measures of fuel-flow and thrust changes to compute if TSFC is increasing or decreasing, the intention being to make this determination independently of any thrust transients resulting from power lever changes or environmental factor.

Correlation logic units of the self-organizing controller implement the parameter search under the guidance of the performance assessment unit for optimum engine areas or other parameter values being optimized. The base design of the correlation logic units incorporates the probability state variable (PSV) search algorithm. This algorithm is suited for simultaneous adjustment for two or more parameters, providing the performance assessment unit has capability for resolving the very small performance differences which are obtained in the proximity of the optimum in the space of parameters. In practice, this may require that the correlation logic units be employed in alternating adjustments of the parameters for which the problem of performance resolution is greatly alleviated. A two-stage search strategy can be used, in which simultaneous parameter adjustments are first made to bring the system close to its optimum state in very little time, after which alternating adjustments are made to effect fine tuning. The correlation logic units receive the value signal V calculated in the performance assessment unit and correlate this signal with information as to the polarity of the immediate past search experiment. In the PSV search mode, a correlation logic correlation signal biases a centered (zero-mean) random variable, the polarity of the resulting biased random variable being detected to find a sense of the next experiment, and all correlation logic units generate output changes simultaneously at a prescribed frequency or asynchronously. In the alternating search mode, the correlation signal is detected without going through summation with a random variable and only one correlation logic unit generates an output change at a time, with each correlation logic unit taking its turn in a prescribed manner.

It is therefore an object of this invention to provide a self-organizing control system for controlling parameters of a turbo jet engine.

It is a still further object of this invention to provide a self-organizing control system for minimizing thrust specific fuel consumption (TSFC).

It is a still further object of this invention to provide a self-organizing control system responsive to basic turbo-propulsion system measurements for maximizing system performance.

It is a yet further object of this invention to provide a self-organizing control system capable of manipulating a predetermined first set of parameters to control a predetermined second set of parameters.

It is a yet further object of this invention to provide a control system for controlling thrust with a controller which employs an inferred thrust measurement.

The above objects and still further objects of the invention will be apparent from a discussion of a specific preferred embodiment of the invention set forth hereinbelow which is provided by way of example and not by way of limitation wherein:

FIG. 1 is a block diagram of a control system for a turbine engine utilizing a self-organizing controller (SOC);

FIG. 2 is a block diagram of the thrust controller of FIG. 1;

FIG. 3 is a block diagram of the self-organizing optimizer of FIG. 1;

FIG. 5 is a block diagram of the actuation correlation logic of FIG. 3;

FIG. 7 is a graph representative of surge and temperature limits for variable turbine nozzle areas where $\theta_2$ is the ration of total temperature at the compresser inlet to sea level standard day temperature and $P_{T4}$ is compressor discharge total pressure.

Figure 4:
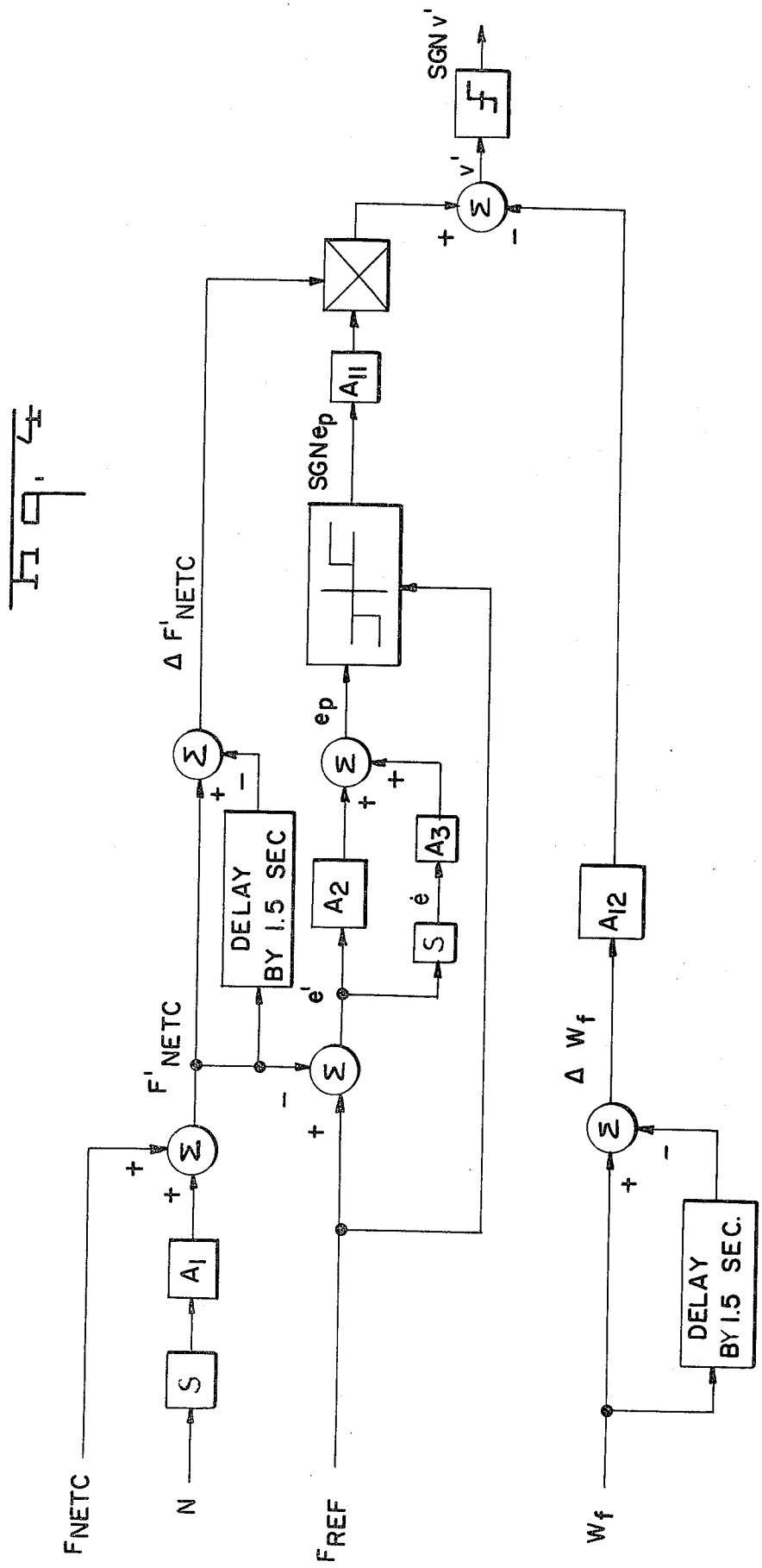
FIG. 4 is a block diagram of the performance assessment unit of FIG. 3.

Referring to FIG. 1, L represents an input setting or signal to the system which is multiplied by a constant K or operated upon in some other way by a constant to provide an $F_{REF}$ signal which is indicative of the commanded thrust. The $F_{REF}$ signal is differenced in a summer with a calculated net thrust $F_{NETC}$ to provide an error signal e which is utilized to operate the system in the following manner:

The error signal is passed to a thrust controller which operates in conjunction with engine limit calculations which are determined, based upon parameter values sensed at the engine, to provide a reference fuel flow signal $W_{fREF}$. This signal ($W_{fREF}$) drives the $W_f$ servo to provide a $W_f$ signal which provides the actual fuel flow rate to the engine. The fuel flow $W_f$ will be increased or decreased, as required, to provide the desired thrust as originally set into the control system by the setting at L. It is now the object of the system to decrease fuel flow $W_f$ to a minimum while obtaining the desired and preset thrust or thrust schedule vs. time.

As explained above, the error signal e is obtained by differencing the commanded thrust $F_{REF}$ and the net calculated thrust $F_{NETC}$. The thrust inference calculation is provided by sensing several of the engine parameters and providing the net calculated thrust which is summed with the commanded thrust as will be explained in detail hereinbelow. The operation of one of the system loops (the outer system loop) wherein fuel flow alone is controlled to provide desired thrust has thus been described. The inner loop operation, wherein the self-organizing controller is used to optimize fuel consumption or thrust specific fuel consumption (TSFC) by variation of the engine parameters, exhaust nozzle area and turbine inlet area will now be explained. It should be understood, however, that other engine parameters or the above mentioned engine parameters in addition to others may also be varied to provide the desired result, the above example merely being provided by way of example. Another possible example would be variation of inlet geometry to the turbine engine.

The self-organizing controller operates upon $A_J$ (exhaust nozzle area) and $A_{A5}$ (turbine inlet nozzle area) in such a way as to minimize fuel flow when attempting to obtain the commanded thrust or while maintaining the commanded thrust. This is obtained by providing the self-organizing controller with an error signal (e' of FIG. 4) obtained by summing $F_{REF}$ and a function of $F_{NETC}$ which is $F'_{NETC}$ in FIG. 4 or with the error signal e and a feedback signal obtained by sensors which measure engine parameters as set forth in parent application Ser. No. 883,549, the self-organizing controller operating on these in the manner to be explained in more detail hereinbelow to provide an $A_{JREF}$ signal and an $A_{A5REF}$ signal for driving the $A_J$ servo and the $A_{A5}$ servos respectively to control the exhaust nozzle area and the turbine inlet nozzle areas respectively.

Referring now to FIG. 2, there is shown a block diagram of the thrust controller of FIG. 1. The thrust controller includes a proportional plus an integral plus a derivative controller, each using e as its input, the integral controller providing an integral of the error and feeding same to a limiter 1, the limits of the limiter being controlled by the maximum and minimum permissible fuel flows as determined by the engine limit calculations as explained hereinbelow. The output of the limiter 1 is fed to a summer along with the error signal multiplied by the constant proportional term $K_p e$ and the derivative of the error signal $K_d e$, the output of the summer being then fed to a further limiter 2, the limits of which are again controlled by the engine limit calculation logic to provide a fuel flow reference output signal $W_{fREF}$.

Referring now to FIG. 3, there is shown a self-organizing optimizer in block form. The self-organizing optimizer includes a performance assessment unit having inputs comprising a computed net thrust $F_{NETC}$, the commanded thrust $F_{REF}$, the engine rpm (N), and the fuel flow rate $W_f$. The performance assessment device determines whether fuel flow is being minimized to provide a value signal SGN V′ which is either positive or negative, depending upon whether system performance is improving or regressing. A SGN V′ signal is then fed simultaneously or alternately to two ACL (actuation correlation logic) units, one of the ACL units having engine limit calculation outputs sent thereto to maintain its output within certain predetermined limits. It should be understood at this point that there will be one ACL unit for each engine parameter being controlled except fuel flow. It should also be noted at this point that only those ACL units which require limits of operation will have a limit calculation signal provided thereto. ACL units increase or decrease their output in a step manner depending upon the value signal SGN V′ provided thereto and upon what they have done by past operation. For positive signals, the ACL units tend to continue their past performance, whereas with negative signals, indicative of regressive performance, the ACL units normally reverse their trend. The output of each ACL unit is passed through a $1/1+\tau s$ smoothing filter to eliminate overly rapid changes in the operation of the associated $A_J$ and $A_{A5}$ servos which might then change the engine parameter at an excessive rate.

There are several possible embodiments of performance assessment, one of which will be described herein. Referring to FIG. 4, there is shown one typical performance assessment device which can be used. In accordance with this embodiment, the net calculated thrust $F_{NETC}$ is summed with the derivative of measured engine rpm (N) multiplied by a constant $A_1$ to provide a net calculated thrust signal $F_{NETC}'$ which is a form of predicted thrust. This form of predicted thrust is compared with the same term delayed by a clock interval $\Delta t$ to obtain $\Delta F_{NETC}'$ which indicates whether thrust has been increased or decreased and by how much. Similarly, $\Delta W_f$ or change in fuel flow is calculated from the measured fuel flow $W_f$. The commanded thrust $F_{REF}$ is summed with $F_{NETC}'$ to compute the error e indicative of the deviation between system commanded thrust and sytem calculated thrust. A predicted error signal $e_p$ is provided by passing the error signal $e'$ through a predictor comprising the summation $e'$ multiplied by a constant $A_2$ and e multiplied by a constant $A_3$. The function SGN $e_p$ of the predicted error $e_p$ is formed by the threshold logic, shown diagrammatically in FIG. 4, wherein SGN $e_p$ equals plus 1 if $e_p$ is greater than a very small multiple, typically 0.005, of $F_{REF}$ or $F_{NETC}'$, SGN $e_p$ equals zero if $e_p$ has a magnitude less than or equal to said very small multiple of $F_{REF}$ or $F_{NETC}'$, and SGN $e_p$ equals minus 1 if $e_p$ is less than the negative of the same small multiple of $F_{REF}$ or $F_{NETC}'$. SGN $e_p$ is then multiplied by a constant $A_{11}$ and this product is multiplied by the cange in thrust, $\Delta F$, computed as described hereinabove. The result of this last multiplication is then summed with the product of the change in fuel flow $\Delta W_f$ multiplied by a constant $A_{12}$ to calculate the value signal V′. The polarity of this value signal, SGN V′, is then determined in a threshold device as indicated in FIG. 4. The mathematical theory of the performance assessment device is fully set forth in *Self-Organizing Control of Advanced Turbine Engines* by Barron et al., August, 1969, Technical Report AFAPL-TR-69-73. In physical terms, the purpose of the performance assessment device is to evaluate whether observed changes in thrust and fuel flow rate are such as to indicate an improvement in TSFC, where TSFC is defined as the ratio $W_f/F$, independently of the net thrust level and without requiring attainment of steady state operating conditions (for which N equals zero) in order to make said evaluation correctly.

The ACL unit (FIG. 5) has a number of inputs which include SGN V′ from the performance assessment unit and engine limit signals, AE being a programmed signal which is zero when a limit must go into effect and which is "unity" when no limit must go into effect, the other inputs $\Delta U''$, $U_{MAX}$ and $U_{MIN}$ being either fixed physical limits or programmable limits. These can be maximum or minimum physical limits. For the non-limiting case, AE equals 1 and SGN V′ is allowed to proceed to the correlation logic, the correlation logic normally operating to generate what it did in the past if SGN V′ is plus and to do the opposite if SGN V′ is minus. The correlation logic can be, for example, the PSV conditioning logic circuit described in U.S. Pat. No. 3,460,096 of Roger L. Barron, wherein the V signal would be the input. The output of the correlation logic $\Delta U$ is multiplied by a constant K. The correlation logic determines the polarity of the $\Delta U$ signal while the amplitude is determined by K. The $K\Delta U$ signal is fed to a U accumulator. The U accumulator is a reversable counter with, in one preferred embodiment, 256 possible levels, the output U′ being a signal which is unique to the level at which the U accumulator is set at that time. A U′ signal is sent to the limiter which has maximum and minimum physical limits applied thereto, the output of the limiter being the $U_{REF}$ signal which is within the physical limits preset on the limiter.

If AE is equal to zero, i.e., the programmed limit is being placed on the system, the input to the correlation logic is zero, since a zero is being fed to the multiplier and the signal to the U accumulator will come from the $\Delta U''$ input, the $\Delta U''$ input coming from the engine limit calculations. The remainder of the ACL unit will operate in the same manner described above. The correlation logic can employ either a deterministic or probabilistic method for arriving at successive decisions concerning the direction of system performance improvement relative to the given manipulated variable for whatever operating conditions may exist. The probabilistic logic is described in the above referenced patent of Barron. The deterministic logic results from the use of a zero amplitude internal noise signal in the circuit described in the above referenced patent.

The thrust inference calculation (FIG. 1) is provided in accordance with the equation:

$$F_{COMP} = A_{A5} P_{T1} f\left(\frac{P_{T7}}{P_{T5}}\right) \sqrt{\frac{2 J \eta_n C_p}{2}} f\left(\frac{P_{AMB}}{P_{T7}}\right)$$

where $F_{COMP}$ is $F_{NETC}$ or net engine thrust as computed by the control system;

$A_{A5}$ is turbine inlet nozzle area;
$P_{T7}$ is turbine discharge total pressure;
$P_{T5}$ is burner discharge total pressure;
J is the mechanical equivalent of heat;
$\eta_n$ is efficiency used in inferred thrust equation;
$C_p$ is specific heat of air at constant pressure;
g is acceleration of gravity;
$P_{AMB}$ is ambient pressure;
f' ($P_{T7}/P_{T5}$) is explained in appendix 1; and
f ($P_{AMB}/P_{T7}$) is explained in appendix 2.

The thrust inference calculation is provided by feeding the prescribed inputs sensed at the engine to a calculator in accordance with the function set forth above or an equivalent function to provide the calculated net thrust. The above calculation can be and would be made by means of a computer, either general purpose or special purpose.

The thrust can also be calculated, for example, from the thrust equation as set forth in equation (6-53) at page 183 of *Mechanics and Thermodynamics of Propulsion*, by Hill and Peterson.

Figure 6A:
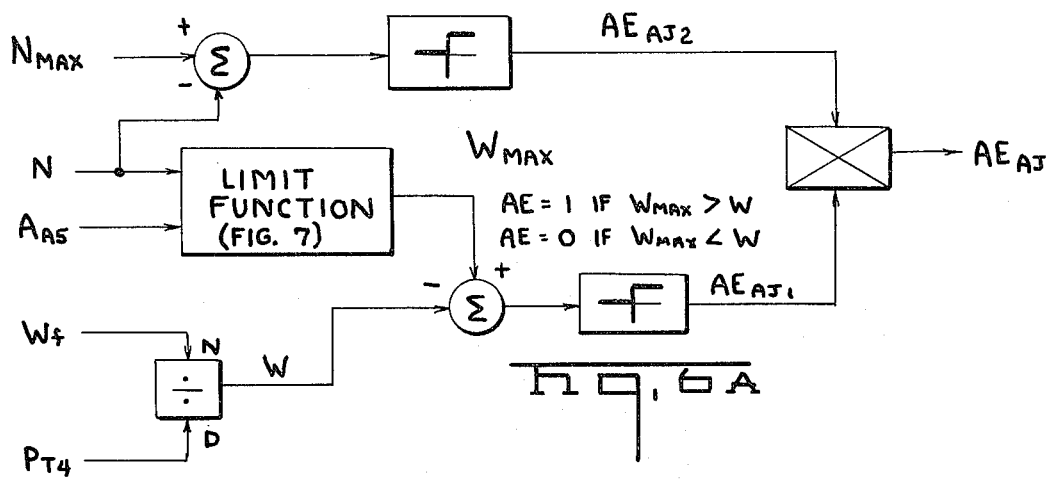
FIG. 6A is a block diagram of the engine limit calculation logic for obtaining the $AE_{AJ}$ signal.
Figure 6B:
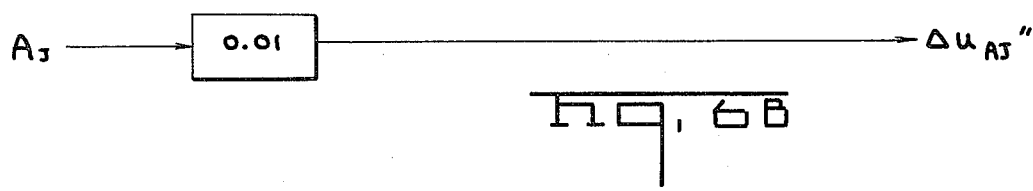
FIG. 6B is a block diagram of the engine limit calculation logic for obtaining the $\Delta U_{AJ}''$ signals.
Figure 6C:
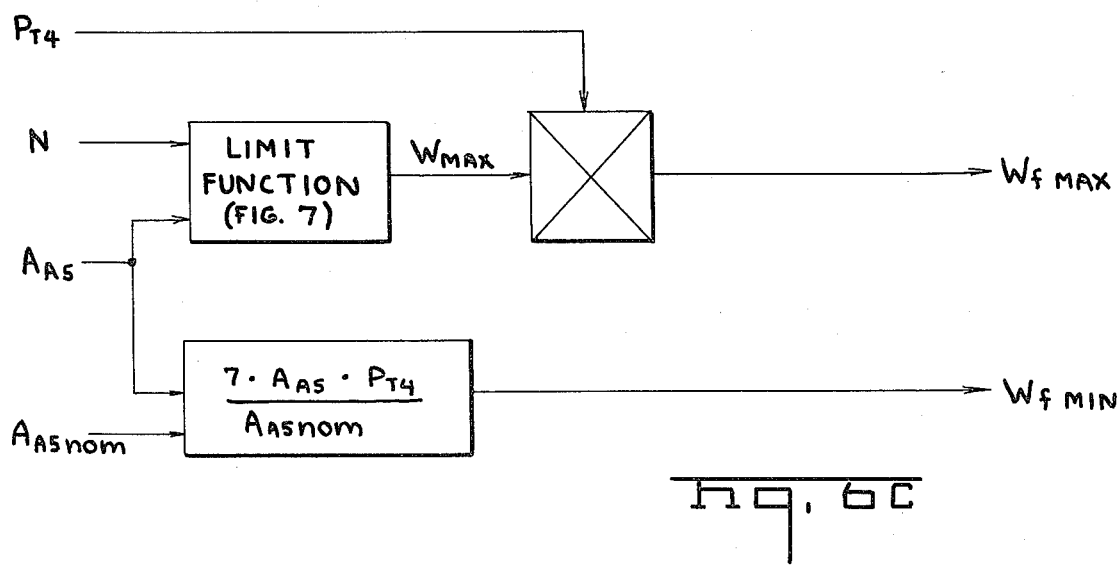
FIG. 6C is a block diagram of the engine limit calculation logic for obtaining the $W_{fMAX}$ and $W_{fMIN}$ signals.

Referring now to FIGS. 6A through 6C, there is shown the contents of the engine limit calculations block of FIG. 1. FIG. 6A describes the manner for obtaining the AE signal utilized in the actuation-correlation logic of FIG. 5. The AE signal is obtained by subtracting engine rpm (N) from maximum permissible engine rpm ($N_{MAX}$) to provide a difference signal, which is fed to a first comparator. The comparator circuit provides a positive output is $N_{MAX}$ is greater than N and provides a zero output if $N_{MAX}$ is less than N. The output $AE_{AJ2}$ is fed to a multiplier. The engine rpm signal and the turbine inlet nozzle area ($A_{A5}$) are fed to a limit function block which operates in accordance with the graph of FIG. 7. The output of the limit function box is $W_{MAX}$, which is the maximum permissible fuel flow, this signal being sent to a summer. A second signal is subtracted from the $W_{MAX}$ signal in the summer, this signal being provided by dividing the fuel flow $W_f$ by the compressor discharge total pressure, $P_{T4}$, to provide an output signal W which is fed to the summer. The output of the summer is fed to a second comparator to provide an $AE_{AJ1}$ signal which is also fed to the multiplier to provide the $AE_{AJ}$ signal. This logic operates such that AE is "unity" if $W_{MAX}$ is greater than W and AE is zero if $W_{MAX}$ is less than W.

The $\Delta U_{AJ}''$ signal is provided as shown in FIG. 6B by multiplying the exhaust nozzle area signal $A_J$ by an appropriate scale factor approximately equal to 0.01.

Referring now to FIG. 6C, the logic is shown in block form for obtaining the maximum and minimum fuel flow signals $W_{fMAX}$ and $W_{fMIN}$ signal provided by computing seven times the product of turbine inlet nozzle area ($A_{A5}$) and the compressor discharge total pressure ($P_{T4}$) divided by nominal turbine nozzle area ($A_{A5-nom}$). The maximum fuel flow rate is computed by operating upon engine rpm (N) and turbine inlet nozzle area ($A_{A5}$) in accordance with the limit function which is also described in FIG. 7. The output thereof, which is $W_{MAX}$ and is the same $W_{MAX}$ computed with reference to FIG. 6A, is multiplied by the compressor discharge total pressure, $P_{T4}$, the output of the multiplier being $W_{fMAX}$, the maximum fuel flow rate.

APPENDIX 1

$$f\left(\frac{P_{T7}}{P_{T5}}\right) = f\left(\frac{P_{T7}}{P_{T5}}\right)\frac{P_{T5}}{P_{T7}}\left\{1 - \eta_T\left[1 - \left(\frac{P_{T7}}{P_{T5}}\right)\frac{\gamma-1}{\gamma}\right]\right\}^{\frac{1}{2}}$$

where
f ($P_{T7}/P_{T5}$) is a turbine nozzle flow parameter;
$\eta_T$ is efficiency of the turbine; and
$\gamma$ is ratio of specific heats of air.

APPENDIX 2

$$F\left(\frac{P_{AMB}}{P_{T7}}\right) = 1 - \left(\frac{P_{AMB}}{C_{DL}P_{T7}}\right)\frac{\gamma-1}{\gamma}$$

where $C_{DL}$ is a coefficient related to duct loss.

Though the invention has been described with respect to a preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A system for on-line control of deviation between system commanded thrust and system calculated thrust of an engine having plural variable and measurable parameters, which comprises:
   (1) command means for providing a commanded thrust signal,
   (2) calculation means responsive to on-line measured engine parameters to calculate engine thrust,
   (3) error means responsive to signals from said command and calculation means to provide an error signal indicative of the difference between the commanded and calculated thrust signals, and
   (4) controller means responsive to said error signal which includes integration means for generating a signal representing an integral of said error signal, differentiation means for generating a signal representing a derivative of said error signal, scaling means for generating a signal proportional to said error signal, and summing means for summing said integral, derivative and proportional signals, where the output of said summing means provides control of a predetermined one of said engine parameters, further including integration limit means for limiting the output of said integration means.

2. A system as set forth in claim 1 further including means responsive to on-line measured engine parameters for controlling said integration limits.

3. A system as set forth in claim 2 further including means responsive to on-line measured engine parameters for controlling the limits of the output of said summing means.

4. A system as set forth in claim 1 further including integration means responsive to on-line measured engine parameters to control at least one of variable turbine inlet area and variable exhaust nozzle area of said engine.

5. A system as set forth in claim 4 wherein said integration means is responsive to on-line measured fuel flow, engine rotational speed and calculated engine thrust.

6. A system as set forth in claim 4 wherein said integration means controls said variable turbine inlet area.

7. A system as set forth in claim 4 wherein said integration means controls said variable exhaust nozzle area.

8. A system as set forth in claim 1 further including integration means responsive to on-line measured engine parameters to control at least one of variable turbine inlet area and variable exhaust nozzle area of said engine.

9. A system as set forth in claim 8 wherein said integration means is responsive to on-line measured fuel flow, engine rotational speed and calculated engine thrust.

10. A system as set forth in claim 8 wherein said integration means controls said variable turbine inlet area.

11. A system as set forth in claim 8 wherein said integration means controls said variable exhaust nozzle area.

12. A system for on-line control of deviation between system commanded thrust and system calculated thrust of an engine having plural variable and measurable parameters, which comprises:
  (1) command means for providing a commanded thrust signal,
  (2) calculation means responsive to on-line measured engine parameters to calculate engine thrust,
  (3) error means responsive to signals from said command and calculation means to provide an error signal indicative of the difference between the commanded and calculated thrust signals, and
  (4) controller means responsive to said error signal which includes integration means for generating a signal representing an integral of said error signal, differentiation means for generating a signal scaling means for generating a signal proportional to said error signal, representing a derivative of said error signal, and summing means for summing said integral, derivative and proportional signals, where the output of said summing means provides control of a predetermined one of said engine parameters, further including summing limit means for limiting the output of said summing means.

13. A system as set forth in claim 12 further including means responsive to on-line measured engine parameters for controlling said summing limits.

14. A system for on-line control of deviation between system commanded thrust and system calculated thrust of an engine having plural variable and measurable parameters including variable turbine inlet area, variable exhaust nozzle area and variable fuel flow rate which comprises:
  (1) command means for providing a commanded thrust signal,
  (2) calculation means responsive to on-line measured engine parameters to calculate engine thrust,
  (3) error means responsive to the signal from said command means and a function of the signal from said calculating means to provide an error signal indicative of the difference between said signal and said function of said signal, and
  (4) controller means responsive to said error signal to control said variable turbine inlet area.

15. A system as set forth in claim 14 further including nozzle area control means responsive to said error signal to control the variable exhaust nozzle area.

16. A system as set forth in claim 15 further including error means responsive to the signal from said command means and the signal from said calculation means to provide a second error signal and fuel flow rate control means responsive to said second error signal to control the variable flow rate.

17. A system as set forth in claim 16 further including optimization means responsive simultaneously to engine fuel flow rate, commanded engine thrust and calculated on-line engine thrust to determine substantially optimum values for exhaust nozzle area and turbine inlet nozzle area to minimize thrust specific fuel consumption for controlling said controller means and nozzle area control means.

18. A system as set forth in claim 17 wherein said optimization means is further responsive to engine rotary speed.

19. A system as set forth in claim 18 wherein said optimization means further affects said fuel flow rate control means.

20. A system as set forth in claim 17 wherein said optimization means further affects fuel flow rate control means.

21. A system as set forth in claim 14 further including error means responsive to the signal from said command means and the signal from said calculation means to provide a second error signal and fuel flow rate control means responsive to said second error signal to control the variable flow rate.

22. A system as set forth in claim 21 further including optimization means responsive simultaneously to engine fuel flow rate, commanded engine thrust and calculated on-line engine thrust to determine substantially optimum values for exhaust nozzle area and turbine inlet nozzle area to minimize thrust specific fuel consumption for controlling said controller means.

23. A system as set forth in claim 22 wherein said optimization means is further responsive to engine rotary speed.

24. A system as set forth in claim 23 wherein said optimization means affects said fuel flow rate control means.

25. A system as set forth in claim 22 wherein said optimization means further affects said fuel flow rate control means.

26. A system for on-line control of deviation between system commanded thrust and system calculated thrust of an engine having plural variable and measurable parameters including variable turbine inlet areas, variable exhaust nozzle area and variable fuel flow rate which comprises:
  (1) command means for providing a command thrust signal,
  (2) calculation means responsive to on-line measured engine parameters to calculate engine thrust,
  (3) error means responsive to the signals from said command means and a function of the signal from said calculation means to provide an error signal indicative of the difference between said signal and said function of said signal, and
  (4) control means responsive to said error signal to control said variable exhaust nozzle area.

27. A system as set forth in claim 26 further including error means responsive to the signal from said command means and the signal from said calculation means to provide a second error signal and fuel flow rate control means responsive to said second error signal to control the variable flow rate.

28. A system as set forth in claim 27 further including computing means responsive simultaneously to engine fuel flow rate, commanded engine thrust and calculated on-line engine thrust to determine substantially optimum values for exhaust nozzle area and turbine inlet nozzle area to minimize thrust specific fuel consumption for controlling said control means.

29. A system as set forth in claim 28 wherein said computing means is further responsive to engine rotary speed.

30. In a self-organizing control system for a turbine type of power plant having a compressor and variable area mechanisms, said system having performance assessment means responsive to power plant operating parameters for assessing the performance of said power plant, correlation logic means responsive to the performance assessment means for adjusting the performance by varying said variable area mechanism in a phase relationship, said performance assessment means including the rate of change of said compressor so that the performance assessment is made during a transient condition of the power plant.

31. A fuel control for a turbine type of power plant having a compressor and variable area geometry, in combination with a self-organizing control having means for assessing the performance of said power plant, fuel metering means having its independent control, means for ascertaining the net thrust of said power plant, said self-organizing control including power assessment means responsive to said fuel metering means, said net thrust ascertaining means and the rate of change of the speed of said compressor wherein said rate of change of the speed of said compressor serves to speed up the response time of said power assessment means.

32. A self-organizing control as claimed in claim 31 including a correlation logic unit responsive to said performance assessment means for determining the phase relationship of the signal generated by said performance assessment means and means establishing the time interval of said correlation logic unit for performing experiments on the performance of said power plant by perturbations of said variable area geometry.

33. A fuel control for a turbine type of power plant having a compressor, a burner, a turbine receiving the exhaust gases of said burner for driving the compressor, and having variable geometry where area varies, a source of fuel, means including a fuel metering means for metering fuel from said source to said burner, means responsive to a plurality of engine operating parameters for calculating an inferred thrust for any given engine operation, means for establishing a desired thrust, means responsive to the calculated inferred thrust and the desired thrust for controlling said fuel metering means, and a self-organizing control system responsive to a plurality of engine operating conditions for adjusting said variable geometry to obtain optimum specific fuel consumption.

34. A fuel control as claimed in claim 33 wherein said means for calculating an inferred thrust is responsive to turbine inlet pressure and turbine discharge pressure.

35. A fuel control as claimed in claim 34 wherein said means for calculating also is responsive to the area of the variable geometry.

36. A fuel control as claimed in claim 33 wherein said self-organizing control is responsive to the metered fuel flow, the net engine thrust and compressor speed.

* * * * *